(12) United States Patent
Shinoda et al.

(10) Patent No.: US 7,536,039 B2
(45) Date of Patent: May 19, 2009

(54) INFORMATION PROCESSING DEVICE

(75) Inventors: Takao Shinoda, Kawasaki (JP); Toshio Kumai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 11/249,470

(22) Filed: Oct. 14, 2005

(65) Prior Publication Data

US 2006/0034499 A1   Feb. 16, 2006

Related U.S. Application Data

(63) Continuation of application No. PCT/JP2004/005301, filed on Apr. 14, 2004.

(30) Foreign Application Priority Data

Apr. 15, 2003  (WO) .................. PCT/JP03/04764

(51) Int. Cl.
  *G06K 9/00* (2006.01)
(52) U.S. Cl. .................................... 382/124
(58) Field of Classification Search ............... 382/115; 361/752
  See application file for complete search history.

(56) References Cited

U.S. PATENT DOCUMENTS

| 5,956,415 | A | 9/1999 | McCalley et al. |
|---|---|---|---|
| 6,088,585 | A | 7/2000 | Schmitt et al. |
| 6,327,376 | B1 | 12/2001 | Harkin |
| 6,804,121 | B2 * | 10/2004 | Fischbach et al. ............ 361/752 |
| 2001/0031074 | A1 | 10/2001 | Yamazaki et al. |
| 2002/0003892 | A1 | 1/2002 | Iwanaga |
| 2002/0044675 | A1 | 4/2002 | Chikazawa et al. |
| 2002/0088632 | A1 | 7/2002 | Salatino et al. |

FOREIGN PATENT DOCUMENTS

| EP | 0 789 334 | 8/1997 |
|---|---|---|
| EP | 0 789 334 B1 | 4/2002 |
| EP | 1197911 | 1/2007 |
| JP | 64-3974 | 1/1989 |
| JP | 5-95329 | 4/1993 |
| JP | 9-289268 | 11/1997 |
| JP | 2001-5951 | 1/2001 |
| JP | 2001-143056 | 5/2001 |
| JP | 2001-155137 A | 6/2001 |
| JP | 2001-510579 | 7/2001 |
| JP | 2002-49593 | 2/2002 |

(Continued)

OTHER PUBLICATIONS

Office Action for corresponding Korean Patent Application No. 10-2005-7019525; Nov. 16, 2006.

*Primary Examiner*—Tom Y Lu
(74) *Attorney, Agent, or Firm*—Arent Fox LLP

(57) ABSTRACT

An information processing device including a personal authentication function by reading a fingerprint. The device has a detection structure having an improved detection function. The information processing device (mobile telephone device 2) has a fingerprint read function and a case (4) having a window (20), a fingerprint sensor (22) arranged in the case and having a sensor surface (24) exposed to the window, and a frame (electrode 42) arranged inside or on the case and forming an opening (50) for exposing the sensor surface of the fingerprint sensor from the window, so that the frame is in contact with a finger through the window of the case.

14 Claims, 19 Drawing Sheets

FOREIGN PATENT DOCUMENTS

| | | |
|---|---|---|
| JP | 2002-123821 | 4/2002 |
| JP | 2002-185843 | 6/2002 |
| JP | 2002-213911 | 7/2002 |
| JP | 2002-245443 | 8/2002 |
| JP | 2002-279412 A | 9/2002 |
| JP | 2002-330202 A | 11/2002 |
| JP | 2002-344611 | 11/2002 |
| JP | 2003-18356 A | 1/2003 |
| JP | 2003-83708 | 3/2003 |
| WO | WO 99/28701 | 6/1999 |

\* cited by examiner

INFORMATION PROCESSING DEVICE

CROSS-REFERENCE TO RELATED APPLICATIONS

This application is continuation of International Application No. PCT/JP2004/005301, filed on Apr. 14, 2004, now pending, herein incorporated by reference, which claims priority from PCT/JP03/04764, herein incorporated by reference.

BACKGROUND OF THE INVENTION

1. Field of the Invention

The present invention relates to an information processing device including a function for authenticating a person by reading the person's fingerprints such as a PDA (Personal Digital Assistant), a PHS (Personal Handy Phone System), a PC (Personal Computer), a handheld PC and other portable information terminals, and relates to a fingerprint detection structure in its fingerprint read part.

Mobile phone devices, as an example of information processing devices, are increasing range of uses by incorporating variety of applications and by processing various types of information and the like, which requires enhanced security protection such as personal information protection. Therefore, a mobile phone device includes a mechanism to lock its functions, and adopts measures such as releasing a locked state by using a previously registered password. The password uses symbols that can be entered via keys used for dial operation; and although easy to handle, users need to lock up or perform release operation and always have to remember the password. If the users forget the password or neglect to lock up or perform operation, then the security protection cannot be offered. Compared to such a method using passwords, authentication of a person through the person's fingerprint information is easy to handle with the expectation of higher security protection. Fingerprint information can be obtained by bringing a finger into contact with a fingerprint sensor mounted in the information processing device such as the mobile phone device.

2. Description of the Related Art

Among prior patent documents relating to authentication of a person by using the person's fingerprint information, for example, there are Japanese Patent Application Laid-Open Publication Nos. H05(1993)-95329, 2001-5951, 2002-49593, 2002-123821, 2002-185843, 2002-245443, 2001-510579, 2001-155137, 2002-330202, 2002-279412; United States Patent Application Publication Nos. US2001/0031074A1, US2002/0044675A1, US2002/0003892A1, U.S. Pat. No. 6,327,376B1 and others.

Japanese Patent Application Laid-Open Publication No. H05(1993)-95329 discloses a technology for preventing unauthorized use of other person's mobile phone by the verification of record data during transmittance/reception of the mobile phone. Japanese Patent Application Laid-Open Publication No. 2001-5951 discloses that a fingerprint recognition section includes a cover and static electricity of an operator is removed. Japanese Patent Application Laid-Open Publication No. 2002-49593 (United States Patent Application Publication No. US2001/0031074A1) discloses an authentication system using a display device having an optical living body recognition function in which authentication is performed by holding the palm of a hand to the display part; however this has a shortcoming of blocking the display with the palm of a hand. Japanese Patent Application Laid-Open Publication No. 2002-123821 (United States Patent Application Publication No. US2002/0044675A1) discloses only a fingerprint sensor including a cover and a technology to remove static electricity of an operator. Japanese Patent Application Laid-Open Publication No. 2002-185843 (United States Patent Application Publication No. US2002/0003892A1) discloses an information terminal device having a fingerprint recognition function by an optical sensing method. However, the amount of light from the light source has an influence on the sensitivity of a sensor, which causes more mounting space. Japanese Patent Application Laid-Open Publication No. 2002-245443 discloses a structure of a fingerprint image input device having a display function. However, the palm of a hand blocks the screen and the display function is impaired during detection. Japanese Patent Application Laid-Open Publication No. 2001-510579 (U.S. Pat. No. 6,327,376B1) discloses an electronic device mounting an optical sensing device using a transparent electrode. However, the amount of light passing through the transparent electrode has an influence on the sensitivity of a sensor, which causes more mounting space. Japanese Patent Application Laid-Open Publication No. 2001-510579 discloses only that a fingerprint sensor is mounted in the back of a battery pack of a mobile phone. Japanese Patent Application Laid-Open Publication No. 2002-330202 discloses nothing but a portable terminal device including a fingerprint sensor in the operation panel. Further, Japanese Patent Application Laid-Open Publication No. 2002-279412 discloses a mobile phone that reads fingerprints of a finger in an image sensor disposed in a main body through a slit formed adjacent to a display part. However, sliding fingers on the slit causes a part of skin or dust to enter into the slit, which has a risk of impairing the sensitivity of the sensor.

By the way, various types of information processing devices such as mobile phone devices are required of weight reduction and downsizing; tolerance to external factors such as shock, finger mark, sweat and moisture; ruggedness and durability; enhancement of security functions in order to store valuable personal information through a variety of functions provided therein; and convenience, design, safety functions as well since the devices are touched directly with a hand. Therefore, in order to realize and maintain security functions by detecting fingerprints, the detection function needs to be enhanced and protected.

SUMMARY OF THE INVENTION

The present invention is made in view of the above-described issues and aims to realize a detection structure in which a detection function is enhanced, regarding an information processing device including a function for authenticating a person by reading the person's fingerprints.

To be more specific, the present invention relates to an information processing device including a function for authenticating a person by reading the person's fingerprints, and aims to realize a detection structure that improves ruggedness and durability and that also contributes to weight reduction and downsizing of the information processing device.

Further, as another object, the present invention aims to enhance tolerance to external factors of a sensor part such as shock, finger mark, sweat, and moisture by enhancing protection of the sensor part; prevent reduction in the sensitivity of detecting fingerprints; and to realize a detection structure in which reliability of fingerprint detection is enhanced by maintaining the level of detection sensitivity.

Furthermore, as yet another object, the present invention aims to realize a detection structure that gives consideration to users' safety and design of the information processing device.

To attain the above-described objects, an information processing device of the present invention is an information processing device including a fingerprint read function, comprising a case with a window; a fingerprint sensor disposed in the case, exposing a sensor surface in the window; and a frame disposed inside or on the case, forming an opening to expose the sensor surface of the fingerprint sensor from the window, wherein the frame is in contact with a finger through the window of the case. The frame may be made of either metallic material such as stainless or conductive material.

According to this configuration, the upper surface side of the sensor surface in the fingerprint sensor is surrounded by the frame and a finger placed on the sensor surface touches the frame so that fingerprints can be surely detected and thus detecting function can be enhanced. At the time of detecting fingerprints, since the finger touches the frame as well as the sensor surface simultaneously, pressure from the finger is dispersed on the frame side so that the sensor surface side can be protected from sustaining an excessive pressure.

To attain the above-described objects, the fingerprint sensor may be implemented on a wiring member disposed in the case.

To attain the above-described objects, the frame is in contact with a finger while the sensor surface of the fingerprint senses simultaneously through the window of the case.

To attain the above-described objects, the frame may be made of metallic material as discussed already or may be comprised as a ground electrode. According to such configurations, at the time of detecting fingerprints, since the finger touches the frame as well as the sensor surface simultaneously, pressure from the finger is dispersed on the frame side, so that the sensor surface side can be protected from sustaining an excessive pressure and protection of the fingerprint sensor and a function such as the ground electrode can be realized by the frame. Accordingly, disposing parts for realizing such features becomes unnecessary.

To attain the above-described objects, for example, the fingerprint sensor may be comprised of a contact sensor detecting a fingerprint through electrical continuity obtained by a finger placed between the sensor surface and the frame.

To attain the above-described objects, as a configuration of the frame, the frame may be comprised of the case formed of conductive materials, a conductive member disposed in the case formed of insulating materials, or conductor layers. The conductor layers can be formed of such as vapor deposition, plating, or coating of conductive materials.

Further, to attain the above-described objects, as another configurations of the frame, the frame may further comprise a frame part to let a finger touch; and a leg part having one or more legs sticking out of the frame part, wherein the frame part is disposed on the sensor surface side and the leg part is fixed on the wiring member disposed in the case. Likewise a configuration may be used in which the frame further comprises a frame part formed of metallic materials with the opening to expose the sensor surface, covering the upper surface of the fingerprint sensor; an inclined surface part formed at the edge of the opening of the frame part, inclined toward the sensor surface side; and a leg part having one or more legs sticking out of the margins of the frame part to the fingerprint sensor side. In addition, a configuration may be used in which the frame further comprises a metallic layer on which solder can be applied on a portion formed of stainless, the portion touching a conductor portion of the wiring member. As a means of connecting the frame and the conductor portion of the wiring member, soldering, a conductive adhesive, or mechanical adhesion can be used. When the frame is formed of stainless, providing a metallic layer on which solder can be applied on a portion that touches a conductor portion enables soldering to attain good connection and adhesion.

Further, to attain the above-described objects, as a sealing structure on the window side, a space between the frame and the case may be sealed with a sealing member or a space between the frame and the fingerprint sensor may be sealed with the sealing member.

Further, to attain the above-described objects, as a supporting structure of the frame, a space between the frame and the fingerprint sensor may be interposed with an elastic member. According to this configuration, the elastic member works as a cushion against the finger pressure applied to the frame and the fingerprint sensor side can be protected from sustaining an excessive pressure.

Further, to attain the above-described objects, as a protective form of the fingerprint sensor or its sensor surface, a protective cover may be further-provided that opens or closes the window of the case and protects the sensor surface in case where the window is closed. Furthermore, the protective cover, which opens or closes the window of the case and protects the sensor surface in case where the window is closed, may be comprised of either one of a first or a second folding case part constituting the case, wherein the window is closed in case where the first and the second folding case parts are folded.

Such configurations can enhance tolerance to external factors of the sensor part such as shock, finger mark, sweat, and moisture through enhanced protection of the sensor part, and can contribute to prevent reduction in the sensitivity of detecting fingerprints and to improve reliability of fingerprint detection as well by maintaining the level of detection sensitivity.

The above and other objects, features and advantages of the present invention will become more apparent from the following detailed description when taken in conjunction with the accompanying drawings.

DETAILED DESCRIPTION OF THE PREFERRED EMBODIMENTS

First Embodiment

Figure 1:
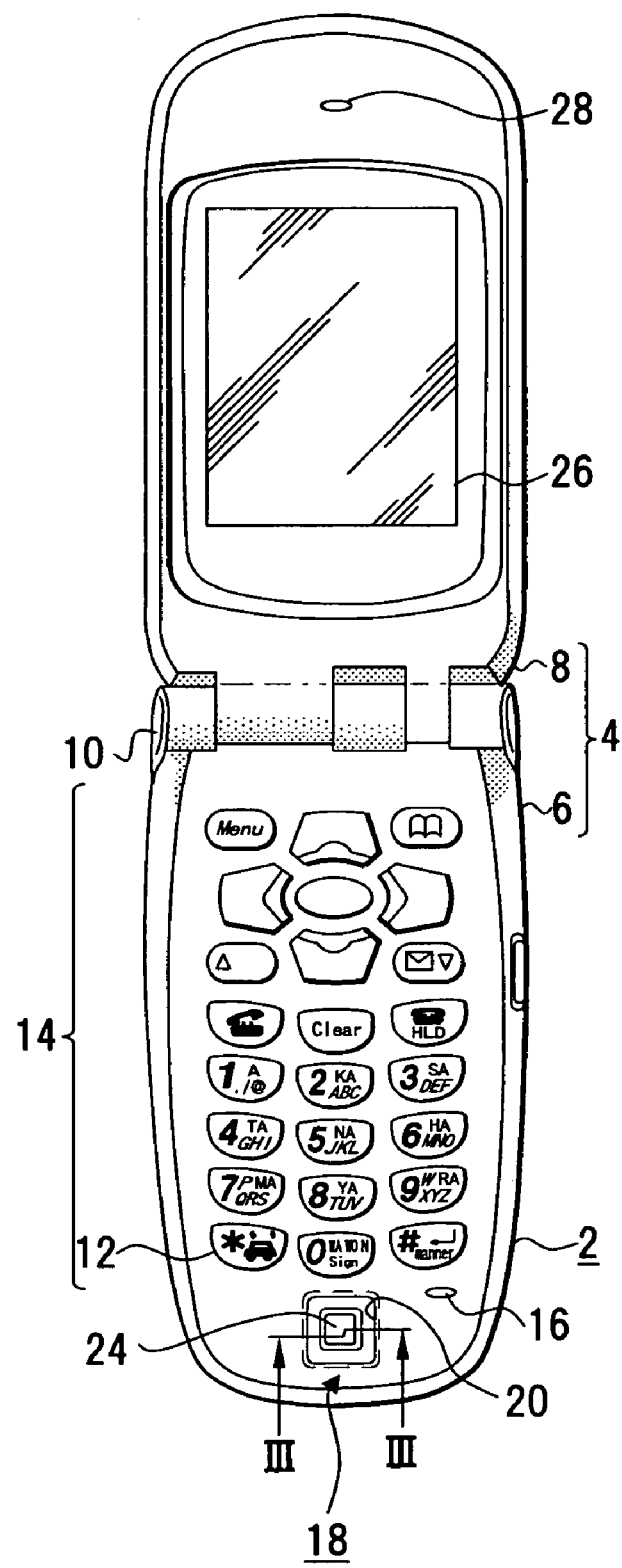
FIG. 1 is a diagram showing a mobile phone device of a first embodiment of the present invention.
Figure 2:
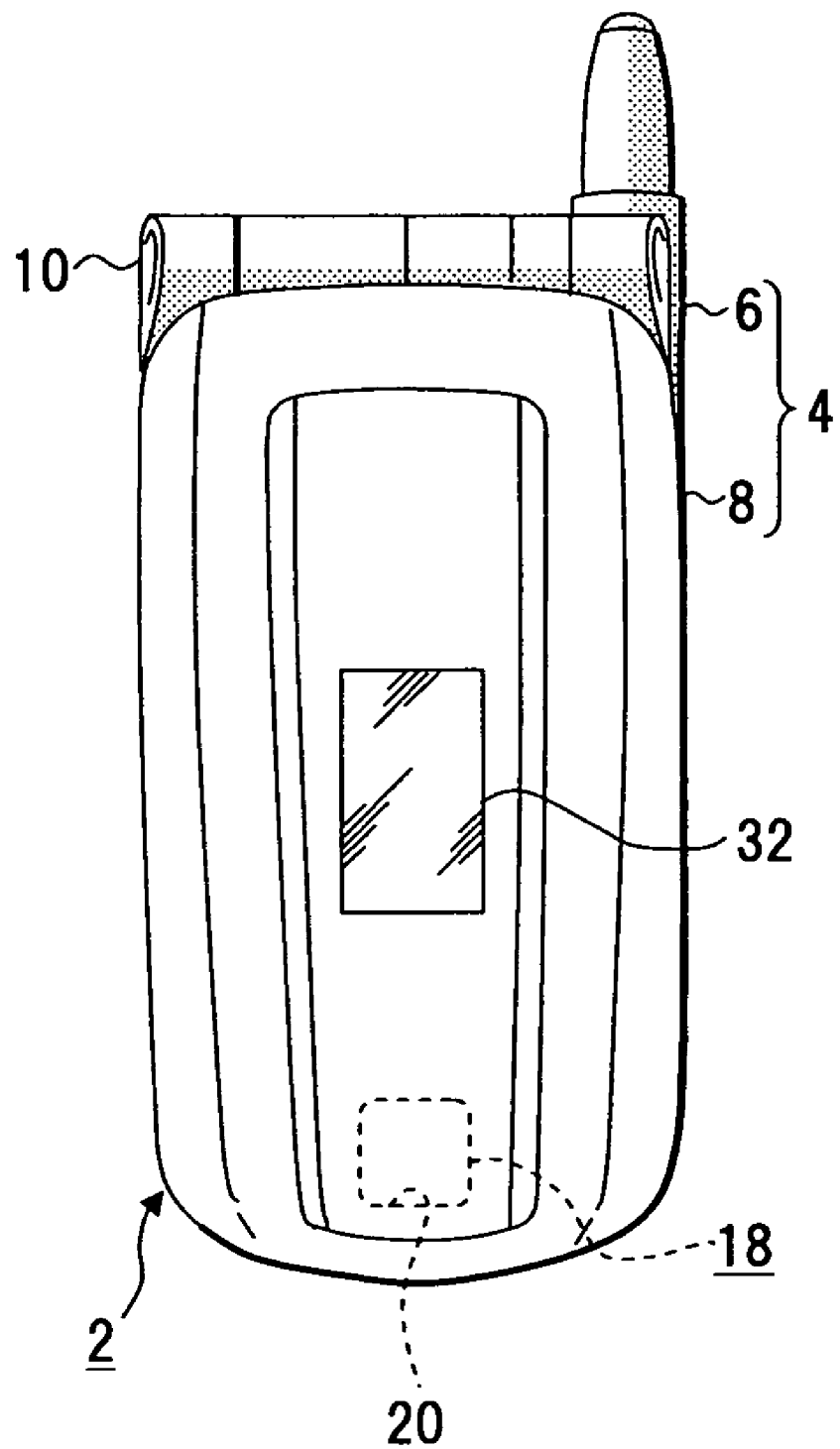
FIG. 2 is a diagram showing the mobile phone device of the first embodiment in a folded state.
Figure 3:
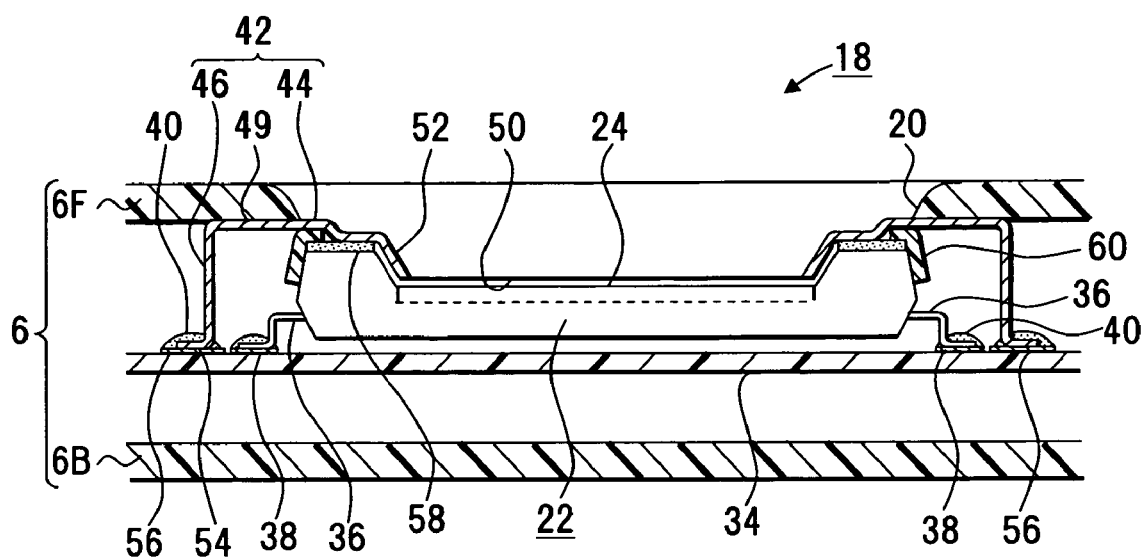
FIG. 3 is an enlarged cross sectional view taken on line III-III in the mobile phone device in FIG. 1.
Figure 4:
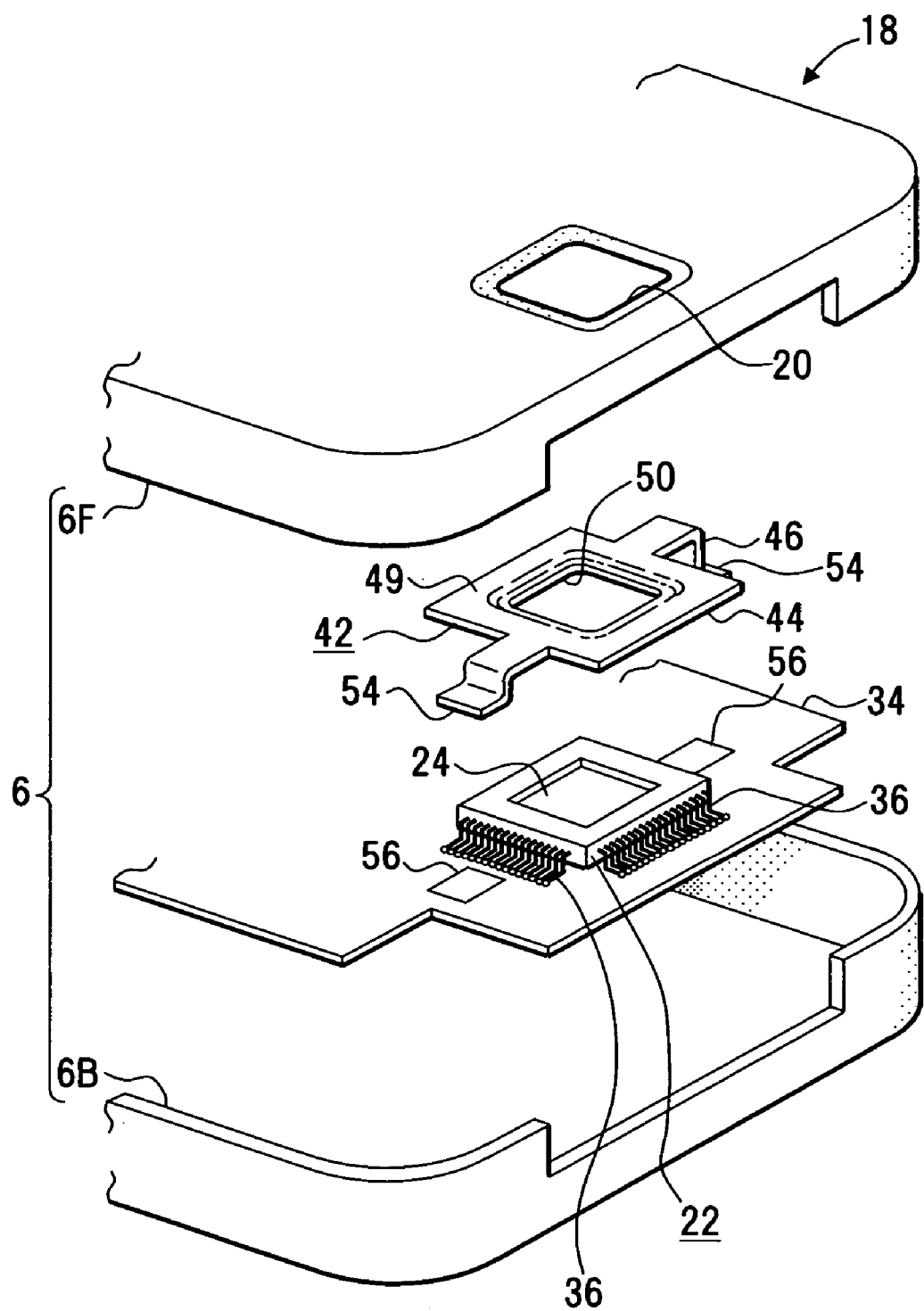
FIG. 4 is an exploded perspective view showing a fingerprint read part in the mobile phone device of the first embodiment.
Figure 5:
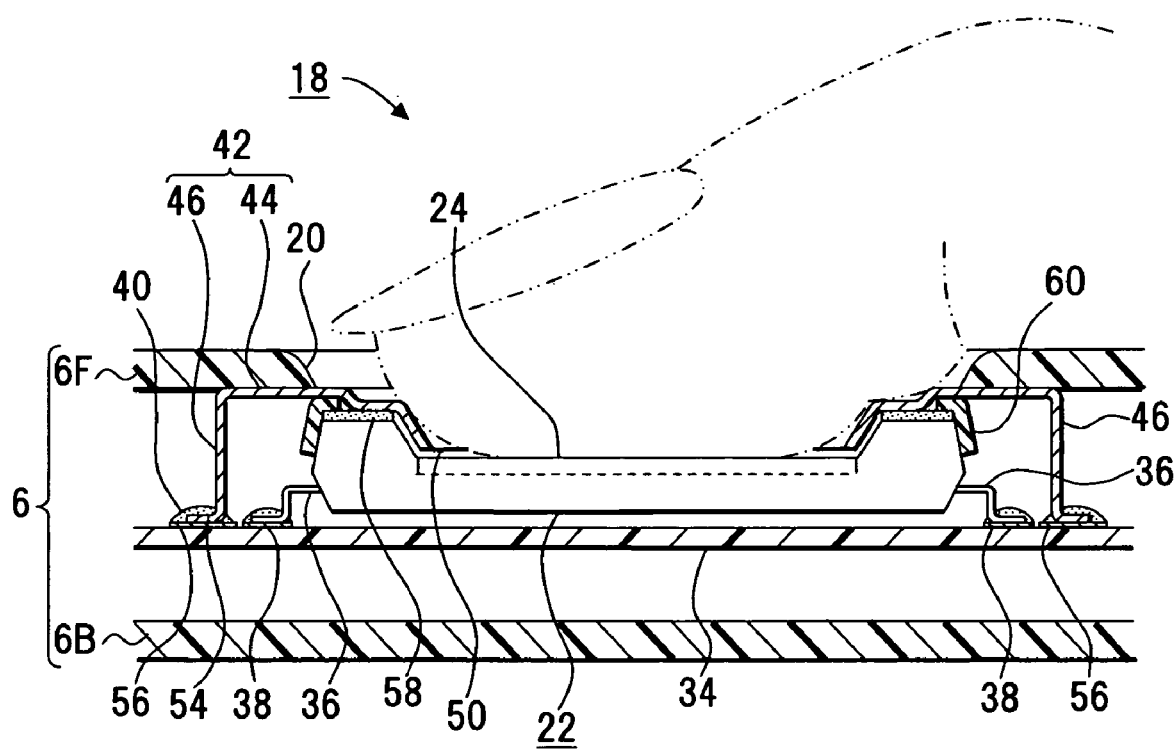
FIG. 5 is a diagram showing the way the mobile phone device of the first embodiment is used.

A first embodiment of the present invention will be described with reference to FIGS. 1 to 5. FIG. 1 is a diagram showing a mobile phone device having a folding mechanism; FIG. 2 is a diagram showing the mobile phone device in a folded state; FIG. 3 is a cross sectional view taken on line III-III in FIG. 1; FIG. 4 is an exploded perspective view showing a fingerprint read part in the mobile phone device; and FIG. 5 is a diagram showing a way the fingerprint read part is used.

In this embodiment, a mobile phone device 2 is exemplified as an information processing device, and a case 4 of this mobile phone device 2 is configured to be folding by connecting a first and a second case part 6, 8 via a hinge part 10. On the outer surface of the case part 6, a key input part 14 including a plurality of keys 12 and a sound intake exit 16 are provided along with a fingerprint read part 18. The fingerprint read part 18 includes, for example, a square window 20 formed on the case part 6 and this window 20 exposes a sensor surface 24 of a fingerprint sensor 22 disposed in the case part 6. The fingerprint sensor 22 is comprised of a contact sensor, for example. Thereby, when a finger is brought into contact with the sensor surface 24 through the window 20, the fingerprint sensor 22 comprised of a touch sensor obtains electrical continuity at a projecting portion of a fingerprint having uneven surface between the sensor surface 24 and the ground point and as a result a fingerprint is detected as an electrical signal. The fingerprint information obtained in the fingerprint sensor 22 is supplied to an unshown processing device as authentication information and used for processing authentication of a person.

Further, on the case part 8 side, a first display part 26 and a sound output exit 28 are provided, and an unshown LCD display is disposed on the display part 26 and a speaker is disposed inside the sound output exit 28.

The folding case parts 6, 8 can be closed by folding as shown in FIG. 2, and the window 20 in the fingerprint read part 18 disposed on the case part 6 side is closed with the case part 8, and the sensor surface 24 inside the window 20 that is a functional part of the fingerprint read part 18 is covered with the case part 8. On the outer surface of the case part 8, a second display part 32 is disposed.

Further, in the fingerprint read part 18, as shown in FIGS. 3, 4, the case part 6 is comprised of a front case part 6F and a rear case part 6B; and the window 20 is formed in the front case part 6F and the fingerprint sensor 22 is disposed inside the case part 6. This fingerprint sensor 22 is implemented on a print circuit board 34 that is a wiring member contained in the case part 6; and its sensor surface 24 is positioned to correspond to the window 20 in the case part 6. Each lead 36 of the fingerprint sensor 22 is connected to a conductor pattern 38 on the print circuit board 34 with a conductive material, for example, solder 40, as a conductor portion of the wiring member. For the conductive material, a conductive adhesive may be used other than the solder 40.

Further, inside the case 4, on the upper surface of the fingerprint sensor 22, an electrode 42 made of conductive materials or metallic materials possessing stiffness such as stainless is disposed as one example of a frame having either or both of the functions as a protective member for protecting the fingerprint sensor 22 or as a touch electrode; and this electrode 42 includes a frame part 44 and a leg part 46. The frame part 44 is larger than the vertical projection area of the fingerprint sensor 22 and disposed between the rear portion of the case part 6F and the upper surface of the fingerprint sensor 22 such that the upper surface of the fingerprint sensor 22 is covered with the frame part 44; and this frame part 44 includes a flat part 49 as well as an opening 50 corresponding to the window 20; and a inclined surface part 52 is formed at the inner edge of the opening 50. In this case, the heights of the flat part 49 are made to differ by bending its middle portion; and the inner wall of the front case part 6F is closely attached to the upper surface of the flat part 49. The inclined surface part 52 is disposed along the shape of the upper surface surrounding the sensor surface 24 of the fingerprint sensor 22 with an inclination toward the sensor surface 24. Further, the leg part 46 is formed on the outer edge of the frame part 44 with a bend toward the thickness direction of the fingerprint sensor 22, and at the tip thereof, a connection part 54 is formed in parallel to the print circuit board 34, for example. This connection part 54 is grounded by being connected to a conductor pattern 56 of the print circuit board 34 with the solder 40, for example, as a conductive connection material. For the conductive connection material, a conductive adhesive other than the solder 40 may be used.

In this embodiment, on the upper surface of the fingerprint sensor 22, an adhesive 58 such as double-faced tape 58 is interposed to attach and fix the frame part 44 of the electrode 42; a packing 60 made of such as rubber is disposed between the frame part 44 and the fingerprint sensor 22 as a sealing member for sealing the space between the frame part 44 and the fingerprint sensor 22 to keep the watertightness.

Measures for the water resistance are taken by using both adhesive 58 and the packing 60. In addition, the space between the frame part 44 and the fingerprint sensor 22 may be sealed to be watertight by bonding the frame part 44 and the fingerprint sensor 22 with the use of a waterproof tape and so on.

According to the mobile phone device 2 of this embodiment, the fingerprint read part 18 is disposed in proximity to the key input part 14 and a fingerprint of a finger can be read in the same way as input via the keys. In that case, as shown in FIG. 5, if the finger is brought into contact with the sensor surface 24 of the fingerprint sensor 22 from the opening 50 in the electrode 42 via the window 20 in the case part 6, then the finger facing the sensor surface 24 touches the electrode 42 through the window 20 and hits the sensor surface 24 exposed from the opening 50 in the electrode 42, so that the finger touches the sensor surface 24 at the same time when it touches the electrode 42. That is, by making electrical conduction by interposing a finger skin touching the sensor surface 24 between the sensor surface 24 and the ground point; and by scanning of the fingerprint sensor 22, a fingerprint on the sensor surface 24 is detected. This detected information is used as authentication information of a person and the security of the mobile phone device 2 can be enhanced.

In this case, when the finger is brought into contact with the sensor surface 24 of the fingerprint sensor 22, pressure from the finger is dispersed by acting on the electrode 42 side, so that the fingerprint sensor 22 and its sensor surface 24 can be protected by the electrode 42 from an excessive pressure or an impact. That is, the electrode 42 functions as a ground electrode making the finger touch when a fingerprint is detected and protects the sensor surface 24 and the fingerprint sensor 22 as well; and realizes the ground electrode function and the protection function in one single electrode 42 so that it contributes to achieve downsizing and weight reduction of the mobile phone device 2 without increasing the number of parts.

Further, if the electrode 42 is comprised of stainless, for example, strength sufficient to hold the pressure from the finger can be secured through its high stiffness and a safety of users can be enhanced without inducing a metal allergy. Moreover, the electrode 42 comprised of stainless can gain a steady electrical conduction with the touch of a finger, without the need to perform rustproofing treatments; maintain the sensitivity of the sensor for the long term; and contribute to a decorative design of the mobile phone device 2.

Furthermore, since the flat part 49 of the electrode 42 and the rear portion of the front case part 6F are tightly bonded, water drops or foreign substances can be prevented from entering into the case part 6; and since the space between the electrode 42 and the fingerprint sensor 22 is tightly bonded with the adhesive 58 and maintained to be watertight with the packing 60 as well, drip-proof and dustproof can be enhanced. That is, entry of water drops or foreign substances into the case 4 can be prevented as well as ruggedness and durability capable of resisting impacts from outside can be obtained, which, as a result, contributes to realize and maintain a highly reliable security function.

Moreover, the configuration of the fingerprint read part 18 on the upper surface of the case part 6 is simplified, and without damaging the design of the mobile phone device 2, the mobile phone device 2 with a higher convenience is configured.

Moreover, on the surface of the electrode 42 exposing in the window 20, surface treatments such as embossing and staining can be applied easily in the same way as the case part 6 that is an exterior member.

Moreover, the electrode 42 consisting of the frame part 44 including the opening 50 and the leg part 46 can be formed of easily by presswork with the use of metallic plates such as a stainless plate; and the inclined surface part 52 can be made into having no notch (cutting) by drawing work. With such work, safety of the fingers can be enhanced.

Moreover, since the packing 60 that is an elastic member is provided in the structure, the elasticity of the packing 60 provides cushioning against the finger pressure applied to the electrode 42, and an excessive pressure applied to the fingerprint sensor 22 side can be suppressed so that the fingerprint sensor 22 can be protected by the packing 60.

In addition, if the folding case parts 6, 8 are folded as shown in FIG. 2 when not used, then the window 20 of the fingerprint read part 18 disposed on the case part 6 side is closed with the case part 8, and the sensor surface 24 inside the window 20 is covered with the case part 8, protecting from entry of water drops or foreign substances.

Second Embodiment

Figure 6:
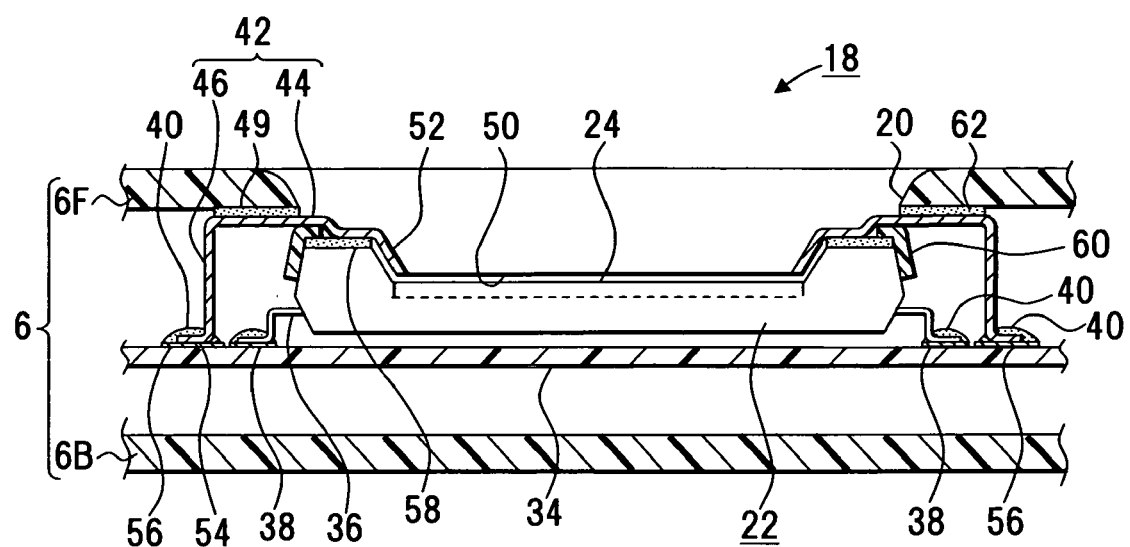
FIG. 6 is an enlarged cross sectional view of a fingerprint read part in the mobile phone device of a second embodiment of the present invention.

A second embodiment of the present invention will be described with reference to FIG. 6. FIG. 6 is a vertical cross sectional view of a fingerprint read part 18 in the mobile phone device of the second embodiment.

In this embodiment, the flat part 49 in the frame part 44 of the electrode 42 as the frame discussed already and the front case part 6F are tightly bonded by interposing the adhesive 62 therein as a sealing member. For the adhesive 62, a waterproof tape can be used, for example. Other configurations are the same as those of the first embodiment, so that the same symbols are assigned and the explanations are omitted.

According to this configuration, the space between the flat part 49 in the frame part 44 of the electrode 42 and the front case part 6F can be sealed by the adhesive 62, so that the entry of water drops or foreign substances into the case part 6 can be protected as well as ruggedness and durability capable of resisting impacts from outside can be attained. Further, after implementing and fixing the electrode 42 firmly on the print circuit board 34, then by sticking, for example, a waterproof double-faced tape on the flat part 49 of the electrode 42 as the adhesive 62, and by placing the front case part 6F thereon, the space between the flat part 49 in the frame part 44 of the electrode 42 and the front case part 6F of the case part 6 can be sealed, which can simplify assembly and realize the watertightness, ruggedness, and durability.

Third Embodiment

Figure 7:
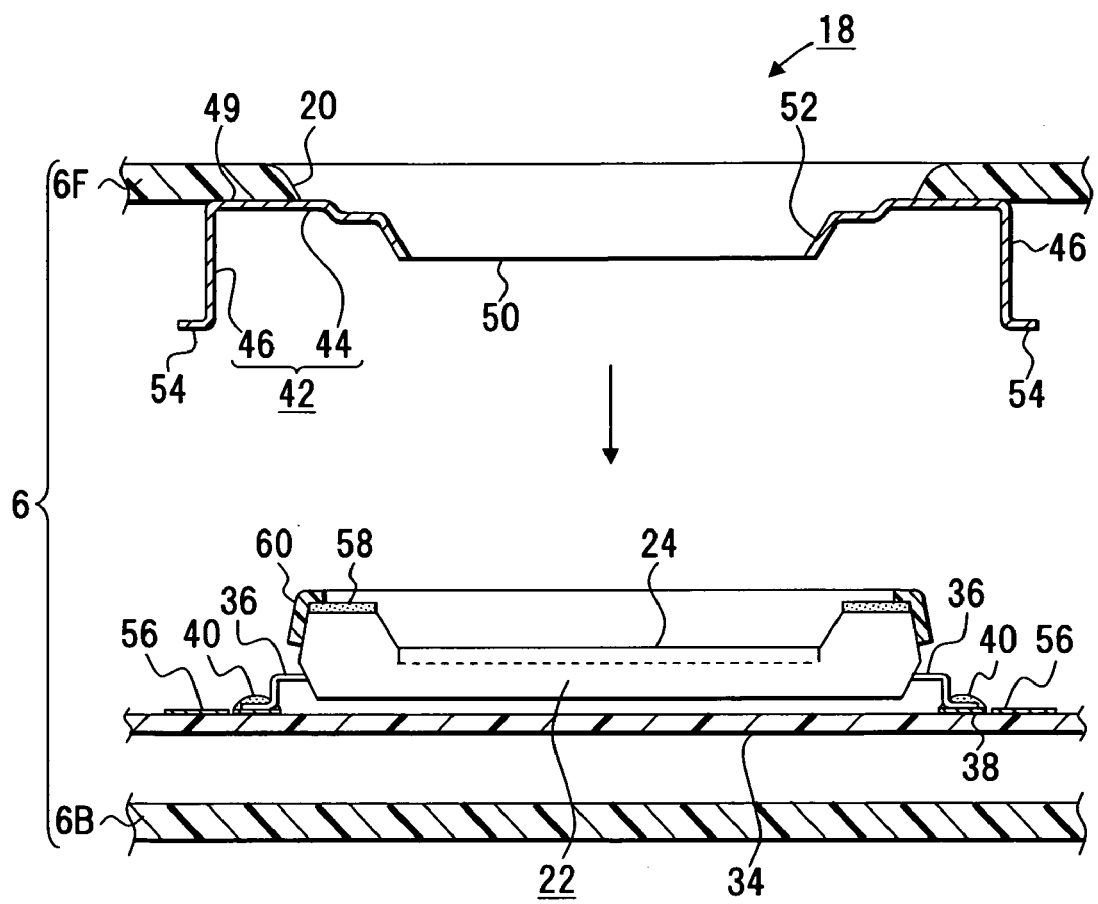
FIG. 7 is an exploded cross sectional view showing a fingerprint read part in the mobile phone device of a third embodiment of the present invention.

A third embodiment of the present invention will be described with reference to FIG. 7. FIG. 7 is an exploded view showing the fingerprint read part 18 in the mobile phone device of the third embodiment.

In this embodiment, the flat part 49 in the frame part 44 of the electrode 42 as the frame discussed already is integrally fixed to inner side of the front case part 6F through resin molding of the case part 6 and the like. Other configurations are the same as those of the first embodiment, so that the same symbols are assigned and the explanations are omitted.

According to this configuration, the bonding of the front case part 6F and the electrode 42 are enhanced; and the case part 6, that is, the case 4 can be protected from the entry of water drops or foreign substances and ruggedness and durability capable of resisting impacts from outside can be enhanced.

Fourth Embodiment

Figure 8:
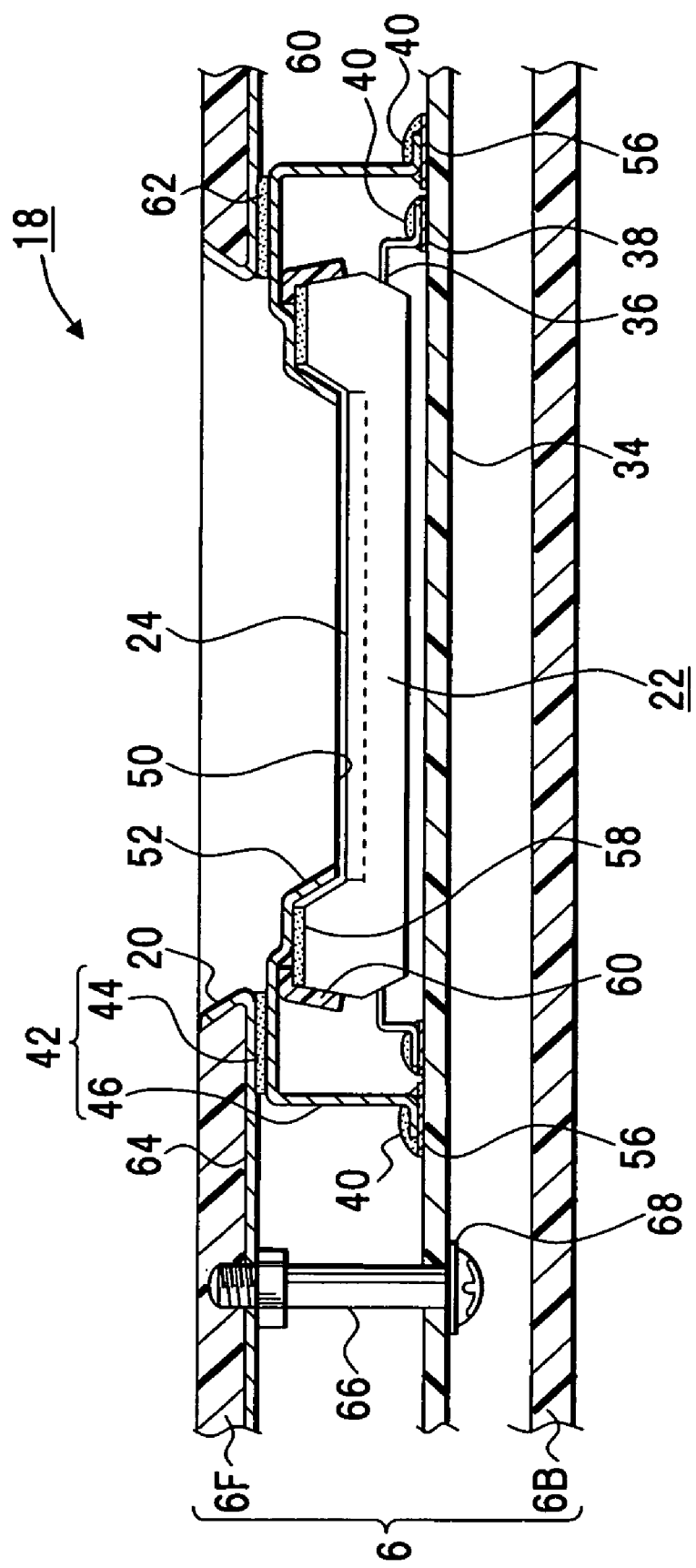
FIG. 8 is an enlarged cross sectional of a fingerprint read part in the mobile phone device of a fourth embodiment of the present invention.

A fourth embodiment of the present invention will be described with reference to FIG. 8. FIG. 8 is a vertical cross sectional view of the fingerprint read part 18 in the mobile phone device of the fourth embodiment.

In this embodiment, a conductor layer 64 is disposed by plating, vapor deposition, or coating of conductive materials both on the rear side of the front case part 6F and on the surface of the surrounding portion of the window 20 as a conductor portion for obtaining electrical conductivity; and on the outer surface of the conductor layer 64, the flat part 49 in the frame part 44 of the electrode 42 as the frame discussed already is bonded tightly with an adhesive material 65. In this case, in the space between the front case part 6F and the print circuit board 34, a screw 66 made of conductive materials is attached and via this screw 66, the conductor layer 64 and a conductor pattern 68 on the print circuit board 34 is connected to each other. The conductor pattern 68 is electrically connected to the electrode 42. Other configurations are the same as those of the first embodiment, so that the same symbols are assigned and the explanations are omitted.

According to this configuration, as has been described with reference to FIG. 5, when the finger is brought into contact with the sensor surface 24 of the fingerprint sensor 22 from the opening 50 in the electrode 42 through the window 20 in the front case part 6F, the finger can touch the conductor layer 64 at the window 20 side, so that the finger portion touching the sensor surface 24 interposes between the sensor surface 24 and the ground point comprised of the electrode 42 and the conductor layer 64, and a fingerprint on the sensor surface 24 can be electrically detected by a scan of the fingerprint sensor 22 and thus accuracy of detection can be enhanced.

On the surface of the conductor layer 64, surface treatments in order to tint or improve conductivity may be applied similar to the case part 6.

Fifth Embodiment

Figure 9:
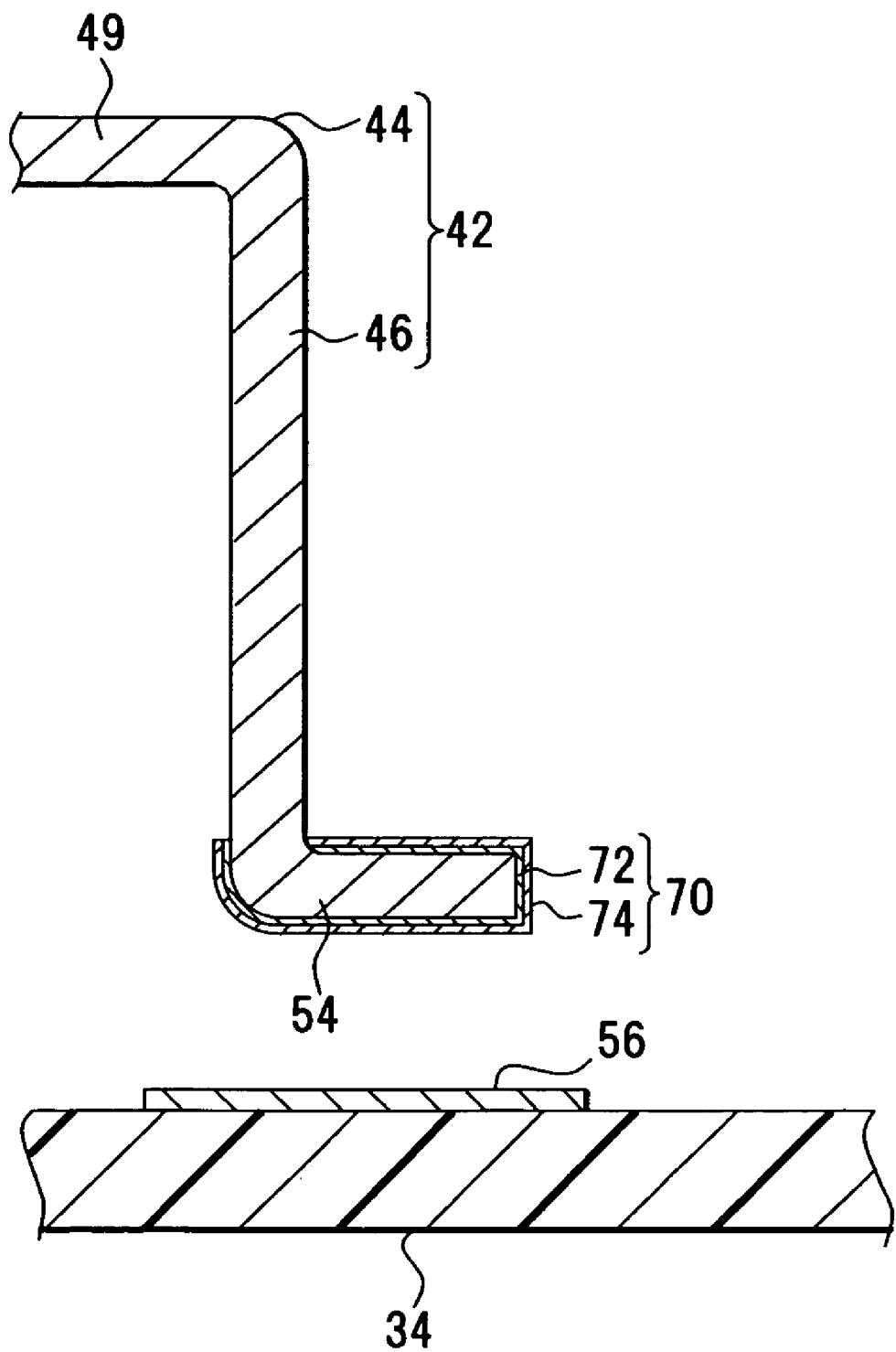
FIG. 9 is an enlarged cross sectional view showing a connection portion of an electrode in the mobile phone device of a fifth embodiment of the present invention.

A fifth embodiment of the present invention will be described with reference to FIG. 9. FIG. 9 is a vertical cross sectional view of the leg part 46 of the electrode 42 used for the mobile phone device of the fifth embodiment.

In this embodiment, processing is shown that is performed in the case where the electrode 42 as the frame discussed already is made of such as stainless and unable or difficult to be connected by soldering. That is, a metallic layer 70 is formed at least on the connection part 54 of the leg part 46 in the electrode 42 in order to enable connection by soldering. This metallic layer 70 consists of a nickel (Ni) layer 72 as a first metallic layer formed on the surface of the center layer of the electrode 42 made of stainless and a gold (Au) layer 74 as a second metallic layer formed above the nickel layer 72. A palladium (Pd) layer may be formed in place of the gold layer 74 as the second metallic layer.

Forming such a metallic layer 70 enhances connectivity by soldering and also connection strength between the electrode 42 and the conductor pattern 56 on the print circuit board 34, and contributes to improve reliability of fingerprint detection. In this case, if a conductive adhesive is used as a means of connection, the processing such as metallic layer 70 is unnecessary.

Sixth Embodiment

Figure 10:
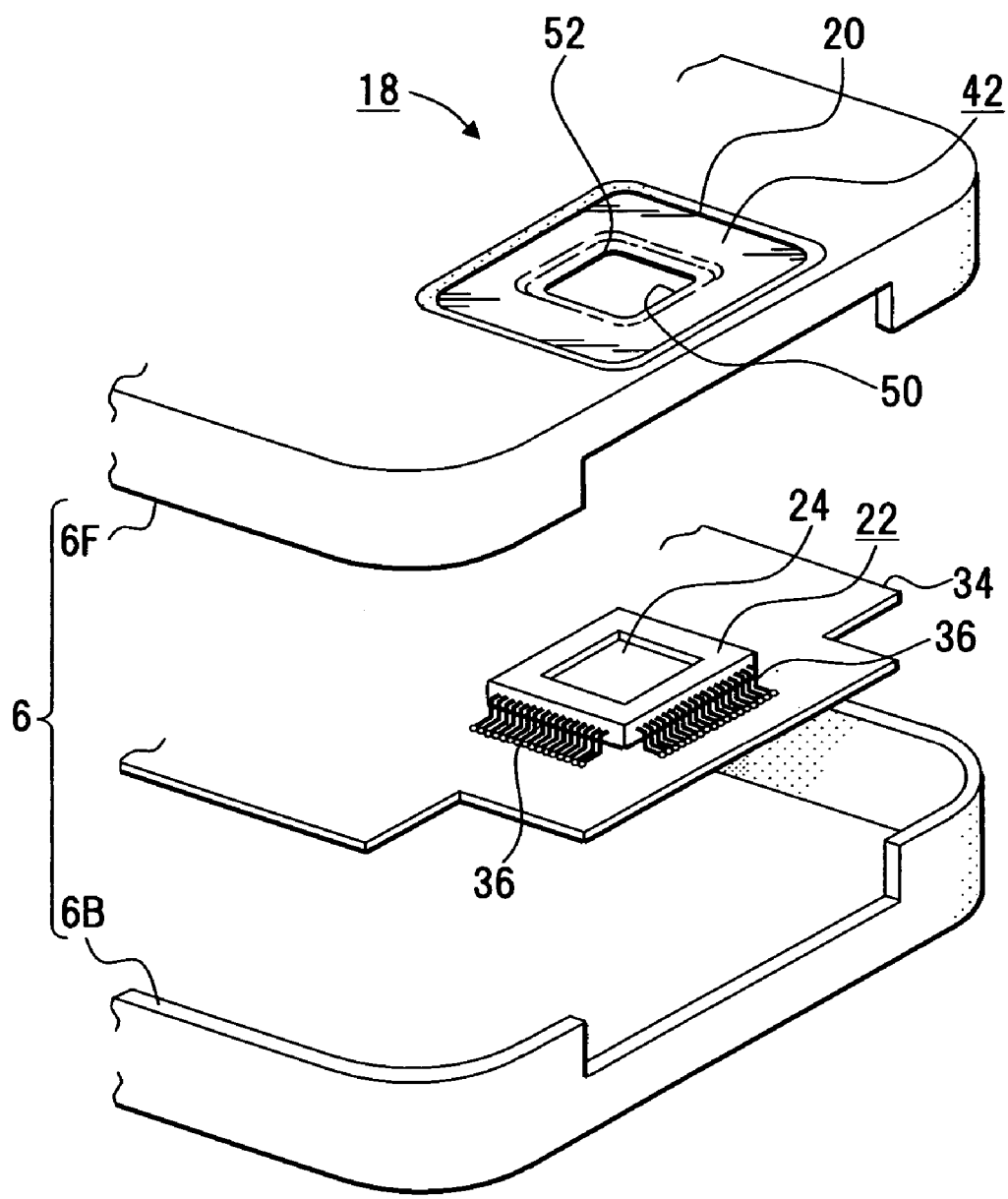
FIG. 10 is an exploded perspective view showing a fingerprint read part in the mobile phone device of a sixth embodiment of the present invention.
Figure 11:
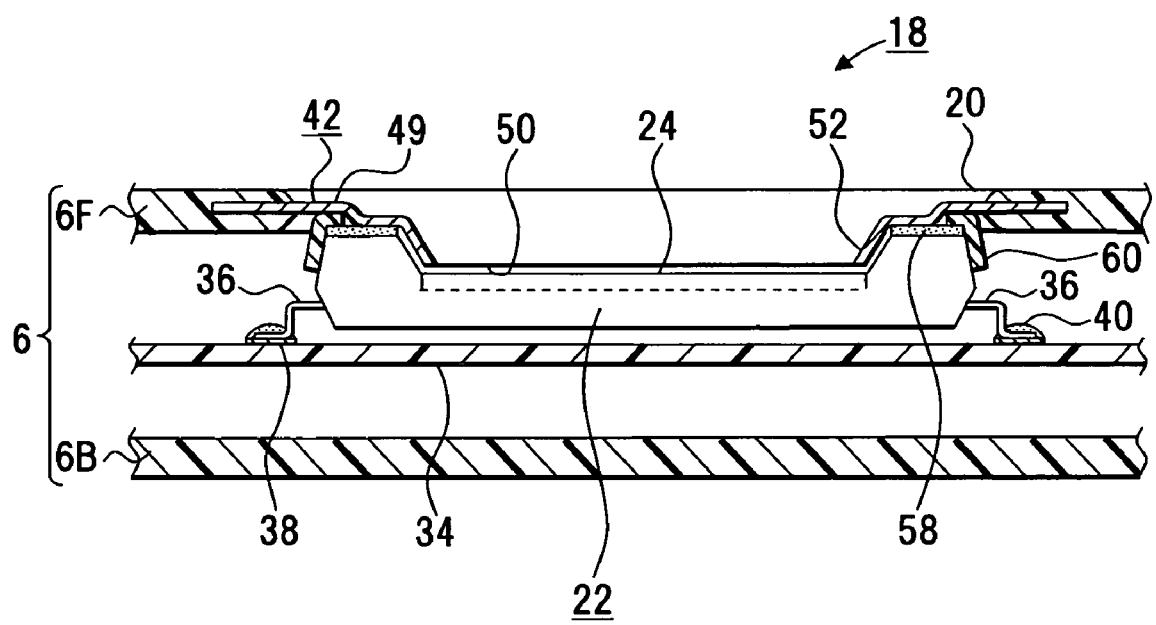
FIG. 11 is an enlarged cross sectional of a fingerprint read part in the mobile phone device of the sixth embodiment of the present invention.

A sixth embodiment of the present invention will be described with reference to FIGS. 10 and 11. FIG. 10 is an exploded perspective view showing the fingerprint read part 18 in the mobile phone device of the sixth embodiment; and FIG. 11 is a vertical cross sectional view of the fingerprint read part 18 in the mobile phone device of the sixth embodiment.

In the first, second, fourth and fifth embodiments, the electrode 42 as the frame discusses already is configured as a separate member of the case part 6. However, in the sixth embodiment, the electrode 42 is integrated into the front case part 6F of the case part 6. In the front case part 6F, the electrode 42 is disposed in the shape of a plate without the leg part 46; and this electrode 42 is exposed in the window 20 of the front case part 6F; and the opening 50 is formed in the electrode 42. As shown in FIG. 11, the flat part 49 side of the circular shaped electrode 42 is embedded in the front case part 6F of the case part 6 formed of synthetic resin through insert molding. The shape of this electrode 42 is that of the electrode 42 in the first embodiment from which the leg part 46 is removed, so that the same symbols are assigned to the same parts and the explanations are omitted. In this case, although not shown, the electrode 42 is grounded by being connected to the conductor pattern 56 on the print circuit board 34 (FIG. 3, etc.) with the use of such as wiring members.

According to this configuration, as has been described with reference to FIG. 5, when the finger is brought into contact with the sensor surface 24 of the fingerprint sensor 22 from the opening 50 in the electrode 42 through the window 20 in the front case part 6F, the finger can touch the electrode 42 at the window 20 side, so that the finger portion touching the sensor surface 24 interposes between the sensor surface 24 and the ground point comprised of the electrode 42, and a fingerprint on the sensor surface 24 can be electrically detected by a scan of the fingerprint sensor 22 and thus accuracy of detection can be enhanced. Further, since the electrode 42 is integral with the front case part 6F and not configured as a separate part of the front case part 6F, which can contribute to downsizing and weight reduction of the mobile phone device 2 since the number of parts is reduced. Furthermore, in this case, sealing processing between the electrode 42 and the front case part 6F becomes unnecessary; the case part 6, i.e., the case 4 can be protected from the entry of water drops or foreign substances; ruggedness and durability capable of resisting impacts from outside can be obtained; and assembly can be simplified as well.

Seventh Embodiment

Figure 12:
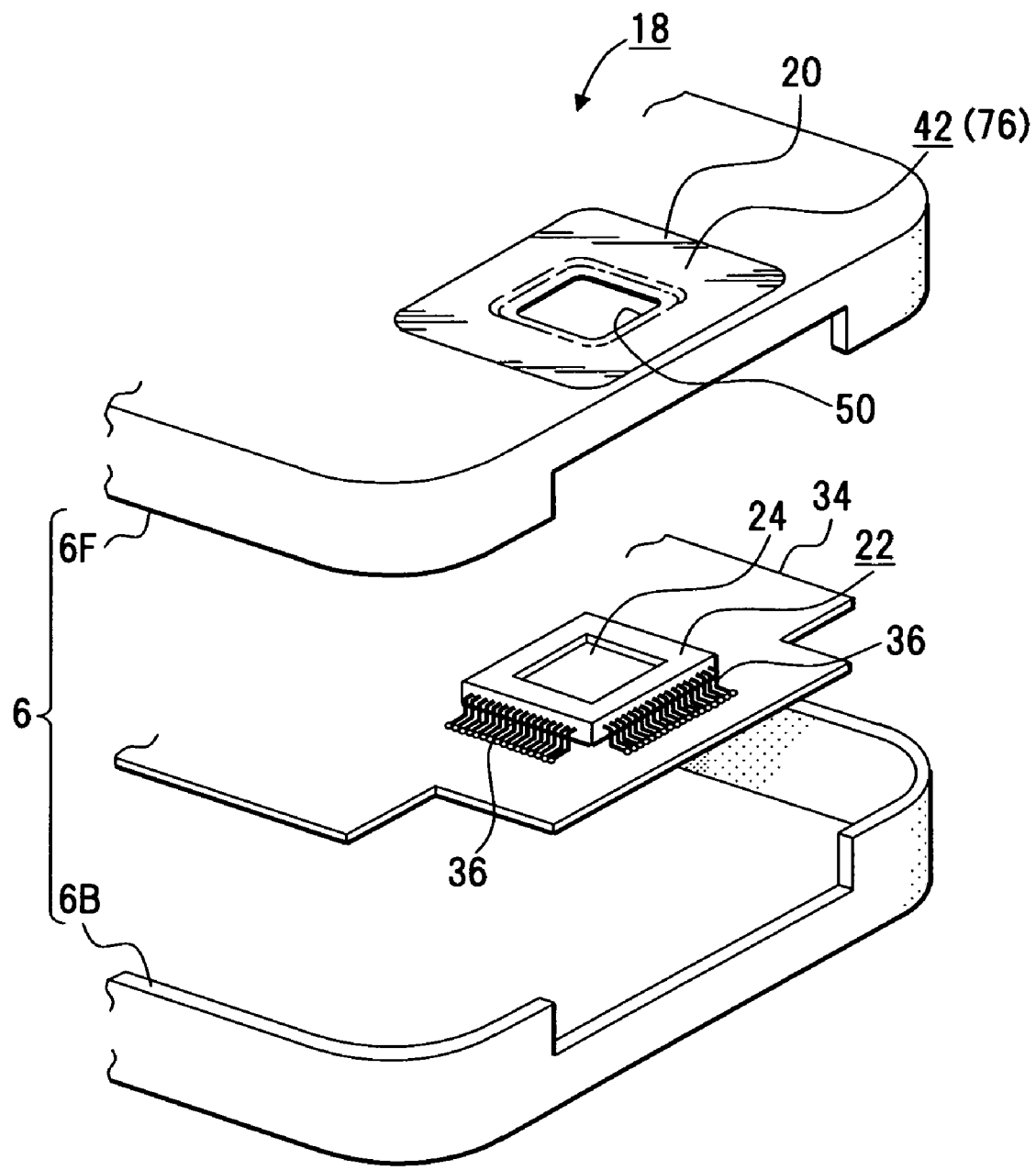
FIG. 12 is an exploded perspective view of a fingerprint read part in the mobile phone device of a seventh embodiment of the present invention.
Figure 13:
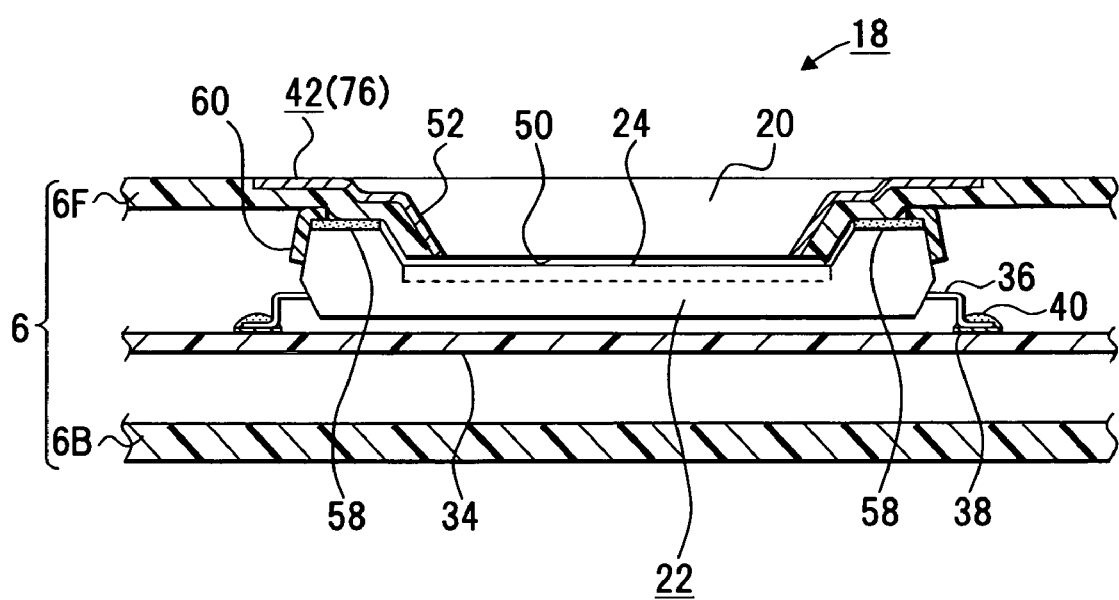
FIG. 13 is an enlarged cross sectional view of a fingerprint read part in the mobile phone device of the seventh embodiment.

A seventh embodiment of the present invention will be described with reference to FIGS. 12 and 13. FIG. 12 is an exploded perspective view of the fingerprint read part 18 in the mobile phone device of the seventh embodiment; and FIG. 13 is a vertical cross sectional view of the fingerprint read part 18 in the mobile phone device of the seventh embodiment.

In this embodiment, the case part 6 is formed of insulating materials such as synthetic resin; and the front case part 6F is configured in the shape of a funnel such that it extends to the sensor surface 24 side of the fingerprint sensor 22; and the conductor layer 76 is formed on the surrounding portion of the window 20 formed in the front case part 6F as a conductor portion for attaining electrical conductivity; and the electrode 42 as the frame discussed already is comprised of the conductor layer 76. As shown in FIG. 13, on the surface of the surrounding portion of the window 20 in the front case part 6F, the conductor layer 76 is comprised of plating, vapor deposition, printing or coating of conductive materials such as metal or conductive resin and constitutes the electrode 42. In this case, although not shown, the electrode 42 is grounded by being connected to the conductor pattern 56 on the print circuit board 34 (FIG. 3, etc.) with the use of such as wiring members. In this embodiment, on the underside of the front case part 6F, the fingerprint sensor 22 is bonded and sealed with the adhesive 58 such as a waterproof double-faced tape and the space between the fingerprint sensor 22 and the front case part 6F is further sealed with the packing 60 disposed on the upper side of the fingerprint sensor 22.

According to this configuration, as has been described with reference to FIG. 5, when the finger is brought into contact with the sensor surface 24 of the fingerprint sensor 22 from the opening 50 in the electrode 42 through the window 20 in the front case part 6F, the finger can touch the conductor layer 76 at the window 20 side, so that the finger portion touching the sensor surface 24 interposes between the sensor surface 24 and the ground point comprised of the electrode 42 (conductor layer 76), and a fingerprint on the sensor surface 24 can be electrically detected by a scan of the fingerprint sensor 22 and thus accuracy of detection can be enhanced. Further, the electrode 42 is integral with the front case part 6F so that the sealing processing between the electrode 42 and the front case part 6F becomes unnecessary, which can contribute to downsizing and weight reduction of the mobile phone device 2 since the number of parts is reduced. Furthermore, the case part 6, that is, the case 4 is protected from the entry of water drops or foreign substances; ruggedness and durability capable of resisting impacts from outside are attained; and assembly can be simplified as well.

Eighth Embodiment

Figure 14:
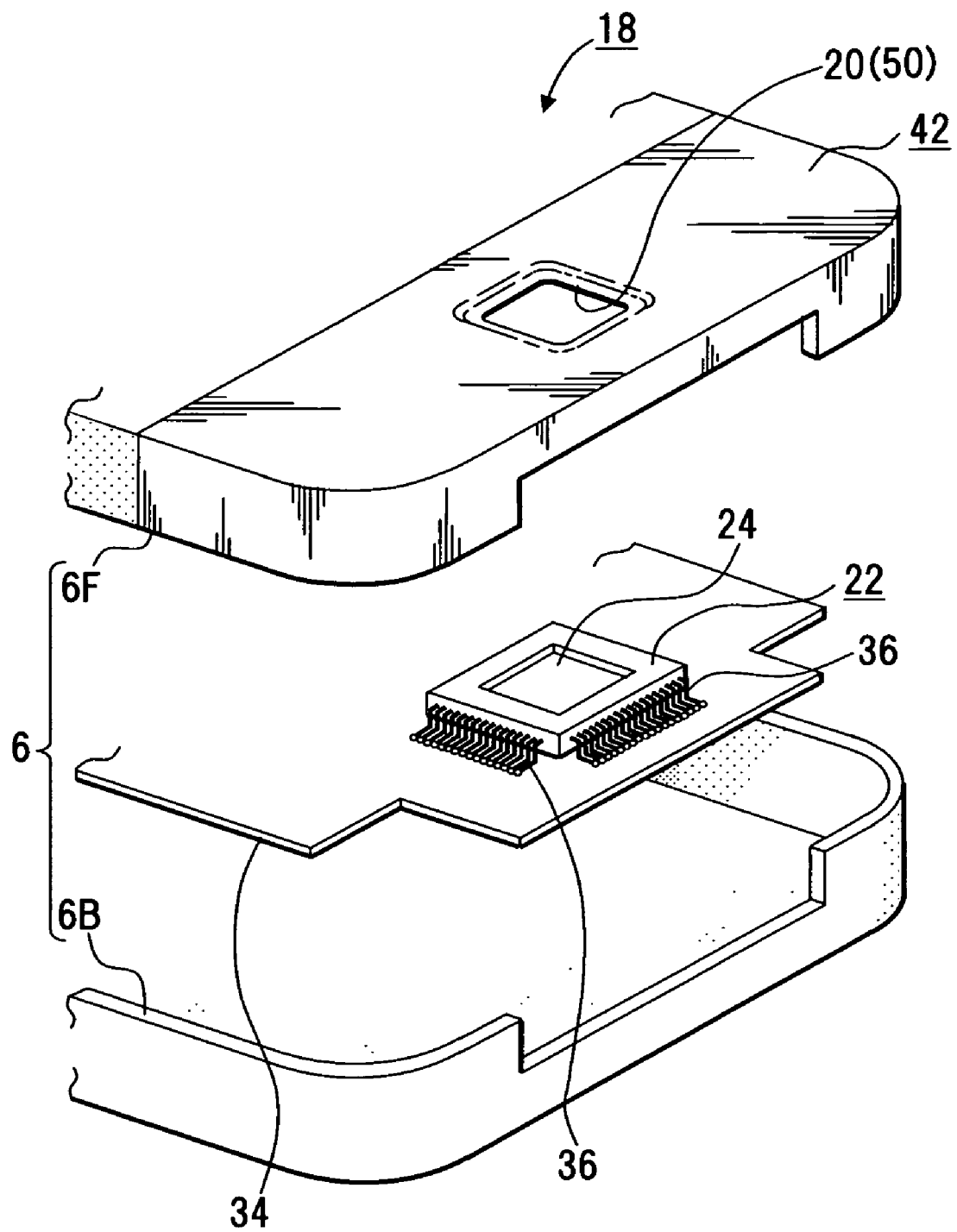
FIG. 14 is an exploded perspective view of a fingerprint read part in the mobile phone device of an eighth embodiment of the present invention.
Figure 15:
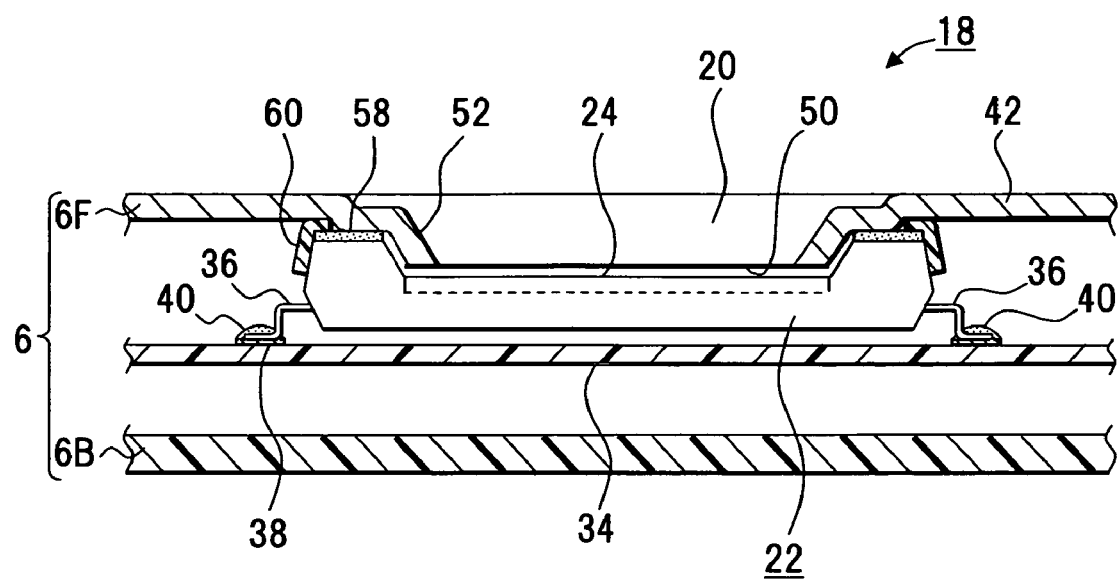
FIG. 15 is an enlarged cross sectional view of a fingerprint read part in the mobile phone device of the eighth embodiment.

An eighth embodiment of the present invention will be described with reference to FIGS. 14 and 15. FIG. 14 is an exploded perspective view of the fingerprint read part 18 in the mobile phone device of the eighth embodiment; and FIG. 15 is a vertical cross sectional view of the fingerprint read part 18 in the mobile phone device of the eighth embodiment.

In this embodiment, the case part 6 is formed of insulating materials such as synthetic resin, and the case portion at the window 20 side formed in the front case part 6F is made of conductive metals such as stainless and thus the electrode 42 as the flame discussed already is constructed. As shown in FIG. 15, the case portion of the window 20 in the front case part 6F is the electrode 42, and in this embodiment, the window 20 in the front case part 6F becomes the opening 50 in the electrode 42 as well. In this case, the shape of the front case part 6F constituting the electrode 42 as well as the sealing of the space between the front case part 6F and the fingerprint sensor 22 is the same as those of the seventh embodiment. Further, although not shown, the electrode 42 is grounded by being connected to the conductor pattern 56 on the print circuit board 34 (FIG. 3, etc.) with the use of such as wiring members.

According to this configuration, as has been described with reference to FIG. 5, when the finger is brought into contact with the sensor surface 24 of the fingerprint sensor 22 from the window 20 in the front case part 6F, i.e., the electrode 42, the finger can touch the electrode 42 so that the finger portion touching the sensor surface 24 interposes between the sensor surface 24 and the ground point comprised of the electrode 42, and a fingerprint on the sensor surface 24 can be electrically detected by a scan of the fingerprint sensor 22 and thus accuracy of detection can be enhanced. Further, the electrode 42 and the front case part 6F are made of the same member so that the sealing processing between the electrode 42 and the front case part 6F becomes unnecessary; the case part 6, i.e., the case 4 is protected from the entry of water drops or foreign substances; and ruggedness and durability capable of resisting impacts from outside are attained. Thus the sealing processing becomes unnecessary and assembly can be simplified.

Ninth Embodiment

Figure 16:
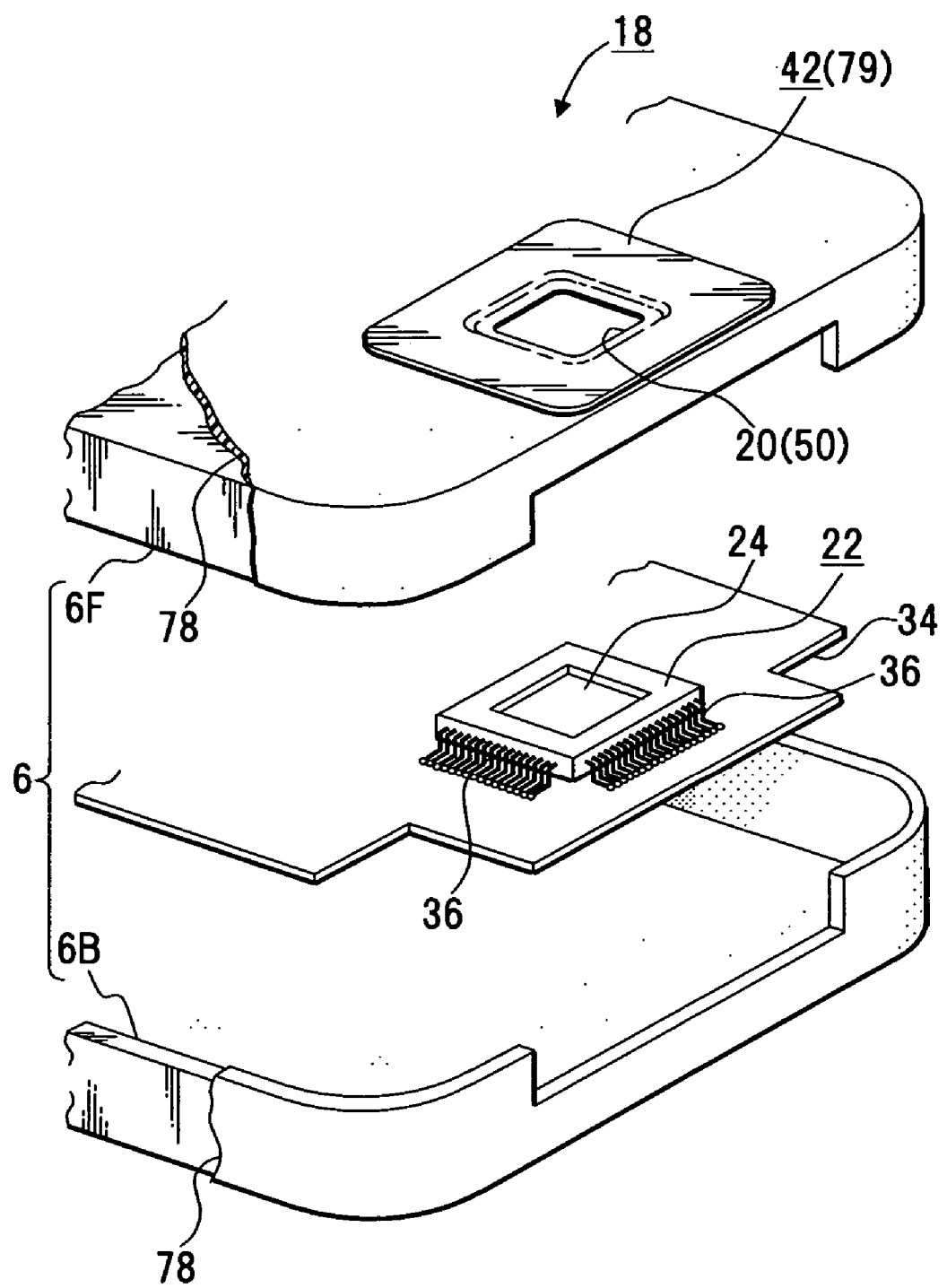
FIG. 16 is an exploded perspective view of a fingerprint read part in the mobile phone device of a ninth embodiment of the present invention.
Figure 17:
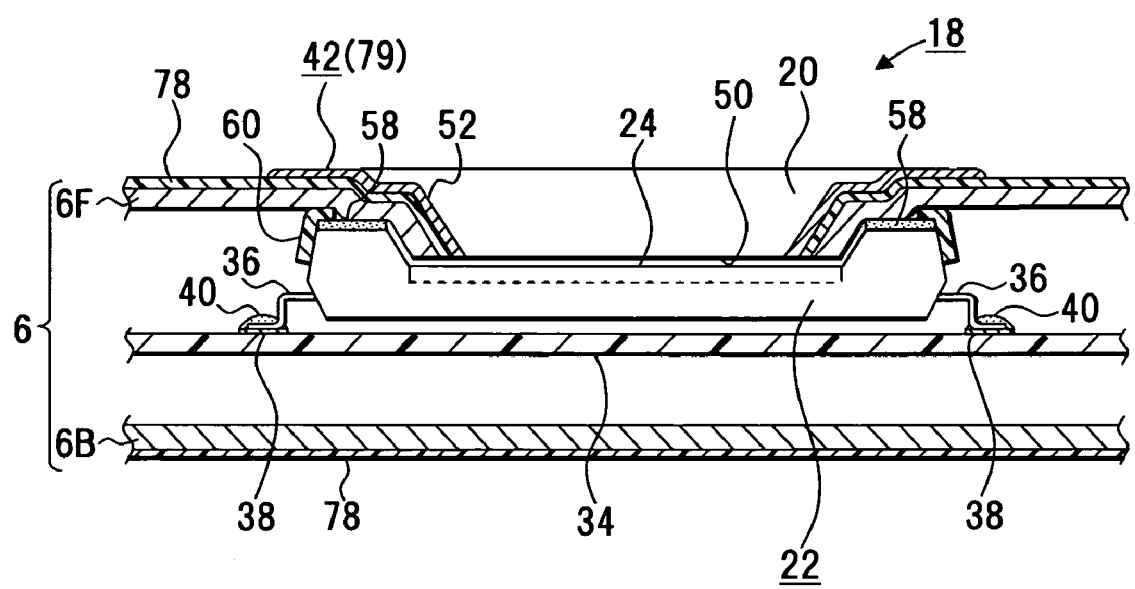
FIG. 17 is an enlarged cross sectional view of a fingerprint read part in the mobile phone device of the ninth embodiment.

A ninth embodiment of the present invention will be described with reference to FIGS. 16 and 17. FIG. 16 is an exploded perspective view of the fingerprint read part 18 in the mobile phone device of the ninth embodiment; and FIG. 17 is a vertical cross sectional view of the fingerprint read part 18 in the mobile phone device of the ninth embodiment.

In this embodiment, for example, the case part 6 is formed of magnesium (Mg) or magnesium alloy as metallic materials, and the electrode 42 as the frame discussed already can be comprised of the case part 6. In this case, as shown in FIG. 17, on the surface of the case part 6, an anticorrosive film 78 is formed as a protective film of such as resin film, and the conductor layer 79 is formed on the surrounding portion of the window 20 by plating of metal or the like as a conductor portion for obtaining electrical conductivity, and the electrode 42 is comprised of this conductor layer 79. In this embodiment, the window 20 in the front case part 6F becomes the opening 50 in the electrode 42 as well. In this case, although not shown, the electrode 42 is grounded by being connected to the conductor pattern 56 on the print circuit board 34 (FIG. 3, etc.) with the use of such as wiring members. In the ninth embodiment, the same symbols are assigned to the same parts as of those of the eighth embodiment and the explanations are omitted.

According to this configuration, as has been described with reference to FIG. 5, when the finger is brought into contact with the sensor surface 24 of the fingerprint sensor 22 from the window 20 in the front case part 6F, i.e., the electrode 42 (conductor layer 79), the finger can touch the electrode 42, so that the finger portion touching the sensor surface 24 interposes between the sensor surface 24 and the ground point comprised of the electrode 42, and a fingerprint on the sensor surface 24 can be electrically detected by a scan of the fingerprint sensor 22 and thus accuracy of detection can be enhanced similar to the previous embodiment. Further, since the electrode 42 is formed in the front case part 6F, the sealing processing between the electrode 42 and the front case part 6F becomes unnecessary; ruggedness and durability capable of resisting impacts from outside are attained; the sealing processing becomes unnecessary; and assembly can be simplified. In this case, the front case part 6F may be formed of metallic materials while the rear case part 6B may be formed of synthetic resin.

Tenth Embodiment

Figure 18:
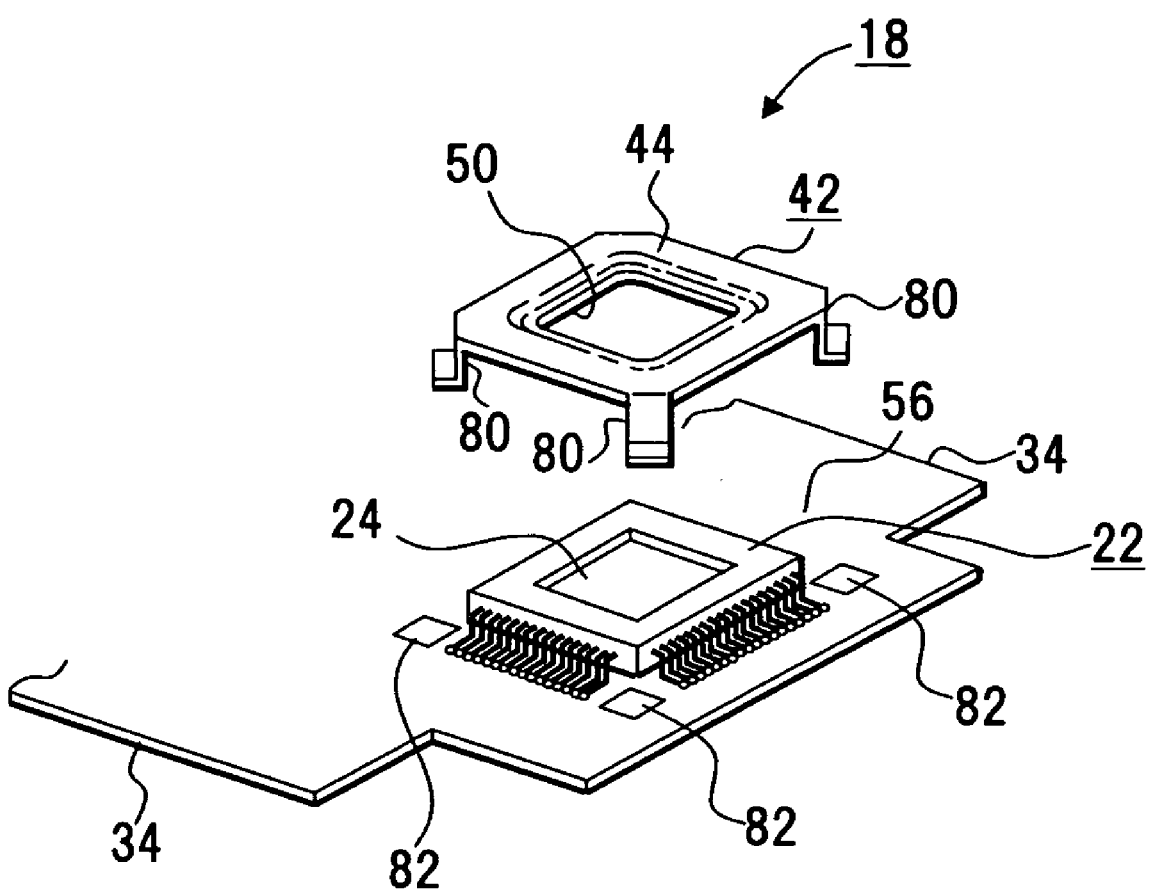
FIG. 18 is an exploded perspective view of a fingerprint read part in the mobile phone device of a tenth embodiment of the present invention.

A tenth embodiment of the present invention will be described with reference to FIG. 18. FIG. 18 is an exploded perspective view of the fingerprint read part 18 in the mobile phone device of the tenth embodiment.

In the electrode 42 of the first embodiment, the frame part 44 is supported with the leg part 46 of two legs at left and right. However, the electrode 42 of this embodiment has a leg part 80 each formed at each four corner of the square shaped frame part 44 having the opening 50 in its center, and the leg part 80 is connected to the conductor pattern 82 formed at the corner side of the fingerprint sensor 22 implemented on the print circuit board 34, and the frame part 44 is supported with four of the leg part 80.

According to this configuration, as has been described with reference to FIG. 5, when the finger is brought into contact with the sensor surface 24 of the fingerprint sensor 22 from the window 20 in the case part 6, i.e., the electrode 42, pressure from the finger can be dispersed from the frame part 44 on each of the leg part 80, so that the fingerprint sensor 22 and its sensor surface 24 can be protected by the electrode 42 from an excessive pressure or an impact.

Eleventh Embodiment

Figure 19:
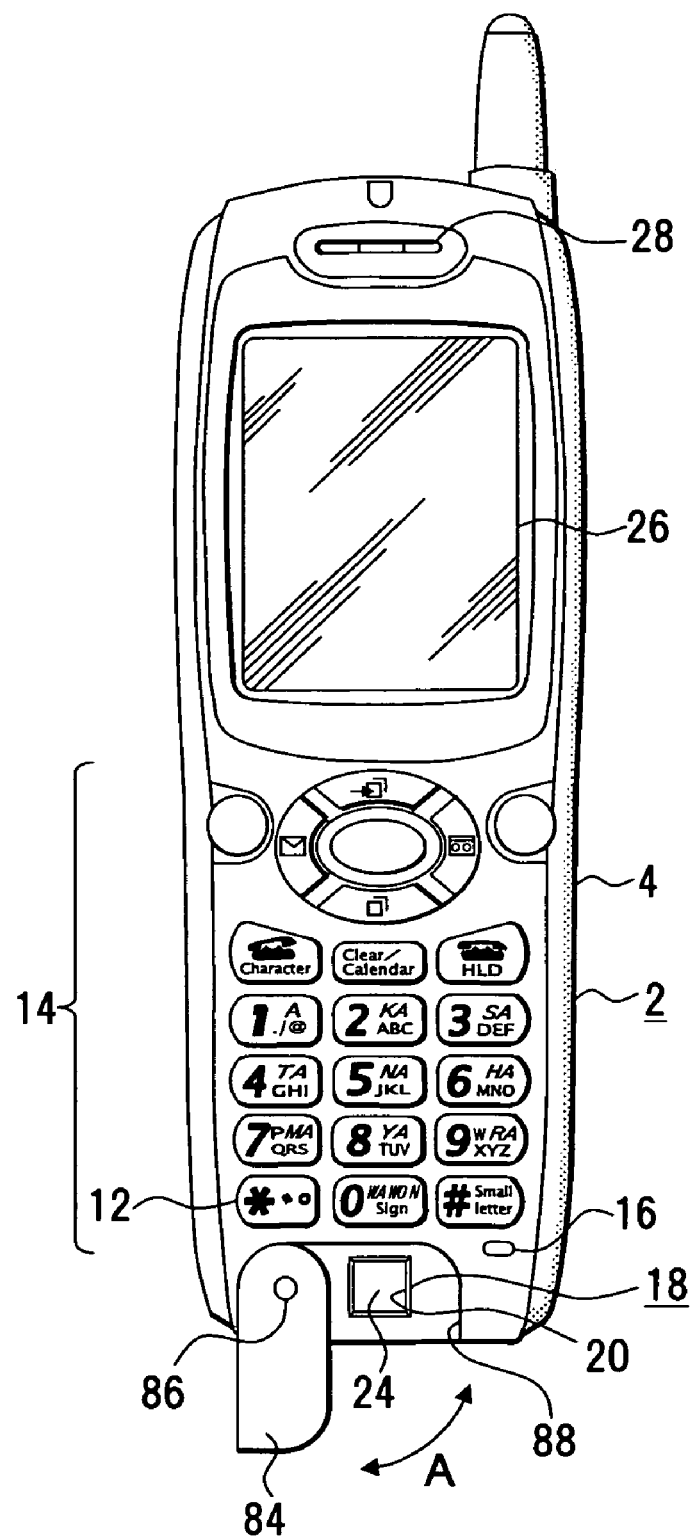
FIG. 19 is a diagram showing a mobile phone device of an eleventh embodiment of the present invention.

An eleventh embodiment of the present invention will be described with reference to FIG. 19. FIG. 19 is a diagram showing a mobile phone device of the eleventh embodiment.

In the first embodiment, the folding structure of the case part 6 and the case part 8 of the mobile phone device 2 is used to provide a protective structure for the fingerprint read part 18; however, in this embodiment, the fingerprint read part 18 is disposed in the case 4 with a protective cover 84 in the shape of a plate as a protective member that opens or closes the window 20. This protective cover 84 is attached to the case 4 via a supporting axis 86 such that it can move in the direction indicated by the arrow A, and a depression 88 corresponding to a plane shape of the protective cover 84 is formed in the case 4. In this depression 88, the window 20 of the fingerprint read part 18 is formed, and the window 20 can be opened/closed by the rotation of the protective cover 84. When the window 20 is closed, the protective cover 84 fits into the depression 88 and is housed under the surface of the case 4. By closing the window 20 with the protective cover 84, the sensor surface 24 of the fingerprint sensor 22 that is a functional portion of the fingerprint read part 18 can be protected.

In addition, although in the above-described embodiment, the frame has been described as the electrode 42 of a ground electrode, the frame may be configured as a reinforcing frame member that doesn't have a function as the ground electrode.

Moreover, in the embodiments from the first to the fifth, the connection part 54 of the leg part 46 in the electrode 42 is connected and fixed to the conductor pattern 56 on the print circuit board 34 by the soldering 40; and in the tenth embodiment, the leg part 80 in the electrode 42 is connected and fixed to the conductor pattern 82 on the print circuit board 34; however, in addition to conductive adhesive, as a means of electrical connection and attachment, mechanical measures such as hanging, swaging, screwing may be used for the wiring member.

Moreover, in the embodiments from the first to the eleventh, the mobile phone device 2 has been exemplified as the information processing device, and the explanations have been made for the configuration of the fingerprint sensor 22 mounted in the mobile phone device 2 and the electrode 42 as the frame. However, configurations of the information processing device of the present invention or configurations of various types of electrode 42 mounted in the mobile phone device 2 as its embodiments constitute the invention of the frame and the electrode; the configuration of the fingerprint sensor 22 using various types of electrode 42 constitutes the invention of the fingerprint sensor; and the configuration comprised of the electrode 42 and the fingerprint sensor 22 constitutes the invention of the fingerprint sensor, so that these are interpreted as independent inventions, therefore the scope of the present invention is not limited to the mobile phone device 2 or the information processing device described in the embodiments.

Moreover, although in the above-described embodiments, explanations have been made for the mobile phone device as an example of the information processing device; the present invention relates to an information processing device including a function for authenticating a person by reading the person's fingerprints such as a PDA (Personal Digital Assistant), a PHS (Personal Handy Phone System), a PC (Personal Computer), a handheld PC and other portable information terminals; and can be applied to various types of information processing devices requiring a fingerprint detection structure in the fingerprint read part, and it is not without saying that fingerprint read devices capturing fingerprint information by being connected to information processing devices is also included in the information processing devices of the present invention, and thus the present invention is not limited to the mobile phone device in the embodiments.

A most preferred embodiment and the like of the present invention have been described above. However, the present invention is not limited to the above description; it goes without saying that various modifications and alterations may be made by a person skilled in the art on the basis of the gist of the invention that is described in the claims and disclosed in the detailed description of the invention, and that such modifications and alterations are included in the scope of the present invention.

The present invention relates to an information processing device including a function for authenticating a person by reading the person's fingerprints, and is useful since a detection structure with an enhanced detection function can be realized.

Further, the present invention can improve ruggedness and durability of the information processing device by sustaining a finger pressure at the frame side; realize enhancement of a ground electrode function and a protective function of the fingerprint sensor, and contribute to weight reduction and downsizing of the information processing device and the like by realizing these functions with the frame and by integrating the case and the frame in one unit.

Further, since the present invention covers the sensor surface of the fingerprint sensor with a protective cover or the case part, which can enhance protection of the fingerprint sensor; improve tolerance of the sensor part to external factors such as shock, finger mark, sweat, moisture; prevent reduction in the sensitivity of detecting fingerprints; maintain the level of detection sensitivity; and enhance reliability of fingerprint detection as well.

Further, since in the present invention the frame is configured of stainless, allergy to metals can be suppressed, which can enhance users' safety; and since the frame is constructed such that the frame having an opening is disposed in the window of the case and the sensor surface is either exposed from the opening or concealed behind the protective cover, design of the device such as the information processing device in which the device is mounted is not damaged, and thus useful.

The invention claimed is:

1. An information processing device including a fingerprint read function, comprising:
   a case of the information processing device;
   a fingerprint sensor incorporated in the case;
   a window formed in the case and exposing a sensor surface of the fingerprint sensor incorporated in the case; and
   a frame disposed inside the case, provided with an opening to expose the sensor surface of the fingerprint sensor inside the window of the case, and wherein the case is configured to expose a circumference part of the opening in the frame inside of the window of the case,
   wherein a sealing member is interposed between the frame and the case, and a part between the frame and the case is sealed to be watertight, and
   wherein, when reading a fingerprint, a finger contacts the frame through the window of the case and the sensor surface through the opening of the frame.

2. The information processing device of claim 1, wherein the fingerprint sensor is implemented on a wiring member disposed in the case.

3. The information processing device of claim 1, wherein the frame is in contact with a finger while the sensor surface of the fingerprint senses simultaneously through the window of the case.

4. The information processing device of claim 1, wherein the frame is made of metallic materials.

5. The information processing device of claim 1, wherein the frame constitutes a ground electrode.

6. The information processing device of claim 1, wherein the fingerprint sensor is comprised of a contact sensor detecting a fingerprint through electrical continuity obtained by a finger interposed between the sensor surface and the frame.

7. The information processing device of claim 1, wherein the frame is comprised of the case formed of conductive materials, a conductive member disposed in the case formed of insulating materials, or conductor layers.

8. The information processing device of claim 1, wherein the frame further comprises:
a frame part to let a finger touch; and a leg part having one or more legs sticking out of the frame part, wherein the frame part is disposed on the sensor surface side and the leg part is fixed on the wiring member disposed in the case.

9. The information processing device of claim 1, wherein the frame further comprises:
a frame part formed of metallic materials with the opening to expose the sensor surface, covering the upper surface of the fingerprint sensor; an inclined surface part formed at the edge of the opening of the frame part, inclined toward the sensor surface side; and a leg part having one or more legs sticking out of the margins of the frame part to the fingerprint sensor side.

10. The information processing device of claim 1, wherein the frame further comprises a metallic layer on which solder can be applied on a portion formed of stainless, the portion touching a conductor portion of the wiring member.

11. The information processing device of claim 1, wherein a space between the frame and the fingerprint sensor is sealed with a sealing member.

12. The information processing device of claim 1, wherein a space between the frame and the fingerprint sensor is interposed with an elastic member.

13. The information processing device of claim 1, further comprising a protective cover that opens or closes the window of the case and protects the sensor surface in case where the window is closed.

14. The information processing device of claim 1, wherein a protective cover, which opens or closes the window of the case and protects the sensor surface in case where the window is closed, is comprised of either one of a first or a second folding case part constituting the case, wherein the window is closed in case where the first and the second folding case parts are folded.

* * * * *